US012633677B2

(12) United States Patent
Li et al.

(10) Patent No.: US 12,633,677 B2

(45) Date of Patent: May 19, 2026

(54) COPLANAR SIDE-FED TIGHTLY COUPLED ARRAY WITH DUAL-POLARIZATION

(71) Applicant: The Board of Trustees of The University of Alabama, Tuscaloosa, AL (US)

(72) Inventors: Linfeng Li, Tuscaloosa, AL (US); Stephen Jie Bang Yan, Northport, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 346 days.

(21) Appl. No.: 17/748,160

(22) Filed: May 19, 2022

(65) Prior Publication Data

US 2022/0393368 A1 Dec. 8, 2022

Related U.S. Application Data

(60) Provisional application No. 63/194,405, filed on May 28, 2021.

(51) Int. Cl.

*H01Q 21/24* (2006.01)

*H01Q 1/36* (2006.01)

(Continued)

(52) U.S. Cl.

CPC ............... *H01Q 21/24* (2013.01); *H01Q 1/36* (2013.01); *H01Q 5/25* (2015.01); (Continued)

(58) Field of Classification Search

CPC ............ H01Q 21/24; H01Q 1/36; H01Q 5/25; H01Q 21/0075; H01Q 21/30; H01Q 25/001

See application file for complete search history.

(56) References Cited

U.S. PATENT DOCUMENTS

| | | | |
|---|---|---|---|
| 6,759,990 B2 | 7/2004 | Rossman | |
| 7,042,401 B2 | 5/2006 | Park et al. | |

(Continued)

FOREIGN PATENT DOCUMENTS

| | | | |
|---|---|---|---|
| CN | 108199137 A * | 6/2018 | ............... H01Q 1/38 |
| CN | 108767454 A * | 11/2018 | ........... H01Q 21/065 |

OTHER PUBLICATIONS

X. Liu et al., "A high-resolution polar ice penetrating radar and experiments in the 28th Chinese National Antarctic Research Expedition," Proceedings of the 15th International Conference on Ground Penetrating Radar, Brussels, Belgium, 2014, pp. 719-722 (Year: 2014).*

(Continued)

*Primary Examiner* — Dieu Hien T Duong

(74) *Attorney, Agent, or Firm* — Meunier Carlin & Curfman LLC

(57) ABSTRACT

An ultra-wideband dual-polarized tightly coupled bowtie antenna array for ground-based polar ice sounding radar is described. The antenna array has a very large effective aperture to increase the directivity. At the same time, it is lightweight and low profile to minimize the payload and maximize the survey range. In an implementation, the antenna array operates between 180-620 MHz with a fractional bandwidth of 3.4:1. The broadband performance benefits from the tightly coupled antenna elements. A feature of the antenna array is the planar feeding structure without balun. The antenna array element has the microstrip feeding line integrated with one arm of the bowtie antenna. The other arm is directly fed by the microstrip line. By adding a ferrite core around the coax cable for common mode suppression, the bowtie antenna element can be fed differentially without using bulky vertical feeding structure and balun.

13 Claims, 15 Drawing Sheets

100

160

(51) Int. Cl.
*H01Q 5/25* (2015.01)
*H01Q 21/00* (2006.01)
*H01Q 21/30* (2006.01)
*H01Q 25/00* (2006.01)

(52) U.S. Cl.
CPC ......... *H01Q 21/0075* (2013.01); *H01Q 21/30* (2013.01); *H01Q 25/001* (2013.01)

(56) References Cited

U.S. PATENT DOCUMENTS

| | | | | |
|---|---|---|---|---|
| 8,633,856 | B2 | 1/2014 | Rao | |
| 2005/0146480 | A1* | 7/2005 | Yazdandoost .......... | H01Q 9/285 343/700 MS |
| 2009/0102705 | A1* | 4/2009 | Obermeyer ......... | G01S 13/9029 343/705 |
| 2010/0309084 | A1 | 12/2010 | Bu et al. | |
| 2018/0083361 | A1* | 3/2018 | Sanpo .................. | H01Q 9/0428 |

OTHER PUBLICATIONS

Bevis, Michael, et al. "Accelerating changes in ice mass within Greenland, and the ice sheet's sensitivity to atmospheric forcing." Proceedings of the National Academy of Sciences 116.6 (2019): 1934-1939.

Doane, K. Sertel and J. L. Volakis, "A Wideband, Wide Scanning Tightly Coupled Dipole Array With Integrated Balun (TCDA-IB)," in IEEE Transactions on Antennas and Propagation, vol. 61, No. 9, pp. 4538-4548, Sep. 2013.

Holland and M. N. Vouvakis, "The Planar Ultrawideband Modular Antenna (PUMA) Array," in IEEE Transactions on Antennas and Propagation, vol. 60, No. 1, pp. 130-140, Jan. 2012.

Huang, K. Zhang, L. Wang and W. Qiao, "An ultrawideband tightly coupled antipodal Vivaldi antenna array for UHF-Ku band applications," 2017 IEEE International Symposium on Antennas and Propagation & USNC/URSI National Radio Science Meeting, San Diego, CA, 2017, pp. 1323-1324.

Lee, S. Livingston, R. Koenig, D. Nagata and L. L. Lai, "Compact light weight UHF arrays using long slot apertures," in IEEE Transactions on Antennas and Propagation, vol. 54, No. 7, pp. 2009-2015, Jul. 2006.

Moghaddam et al., "Dual Polarized UHF/VHF Honeycomb Stacked-Patch Feed Array for a Large-Aperture Space-borne Radar Antenna," 2007 IEEE Aerospace Conference, Big Sky, MT, 2007, pp. 1-10.

Monari et al., "Aperture array for low frequency: The vivaldi solution," 2013 International Conference on Electromagnetics in Advanced Applications (ICEAA), Torino, 2013, pp. 66-69.

Munk et al., "A low-profile broadband phased array antenna," IEEE Antennas and Propagation Society International Symposium. Digest. Held in conjunction with: USNC/CNC/URSI North American Radio Sci. Meeting (Cat. No. 03CH37450), Columbus, OH, 2003, pp. 448-451 vol. 2.

Neto and J. J. Lee, "Infinite Bandwidth long slot array antenna," in IEEE Antennas and Wireless Propagation Letters, vol. 4, pp. 75-78, 2005.

Nunn, Josh A., et al. "A Lightweight Planar Ultrawideband UHF Monopole Mills Cross Array for Ice Sounding." IEEE Antennas and Wireless Propagation Letters 19.7 (2020): 1197-1200.

Pozar, D. M., Schaubert, D. H., Targonski, S. D., & Zawadski, M. (n.d.). A dual-band dual-polarized array for spaceborne SAR. IEEE Antennas and Propagation Society International Symposium. 1998 Digest. Antennas: Gateways to the Global Network. Held in Conjunction with: USNC/URSI National Radio Science Meeting (Cat. No. 98CH36194). doi:10.1109/aps.1998.701626.

Presse, J. M. Floc'h, A. Tarot and C. Camus, "Broadband UHF flexible vivaldi antenna," 2013 Loughborough Antennas & Propagation Conference (LAPC), Loughborough, 2013, pp. 277-280.

Roshna, T. K., et al. "Coplanar stripline-fed compact UWB antenna." Electronics letters 50.17 (2014): 1181-1182.

Shi, Shouyuan, et al. "Ultrawideband optically fed tightly coupled phased array." Journal of Lightwave Technology 33.23 (2015): 4781-4790.

Thomas and J. Huang, "Ultra-wideband UHF microstrip array for GeoSAR application," in IEEE Antennas and Propagation Society International Symposium. 1998 Digest. Antennas: Gateways to the Global Network. Held in conjunction with: USNC/URSI National Radio Science Meeting (Cat. No. 98CH36, Atlanta, GA, 1998, pp. 2096-2099 vol. 4.

Tzanidis, Ioannis, Kubilay Sertel, and John L. Volakis. "UWB low-profile tightly coupled dipole array with integrated balun and edge terminations." IEEE Transactions on Antennas and Propagation 61.6 (2013): 3017-3025.

Weem, Z. Popovic and B. M. Notaros, "Vivaldi antenna arrays for SKA," IEEE Antennas and Propagation Society International Symposium. Transmitting Waves of Progress to the Next Millennium. 2000 Digest. Held in conjunction with: USNC/URSI National Radio Science Meeting (C, Salt Lake City, UT, 2000, pp. 174-177 vol. 1.

Wheeler, "Simple relations derived fom a phased-array antenna made of an infinite current sheet," in IEEE Transactions on Antennas and Propagation, vol. 13, No. 4, pp. 506-514, Jul. 1965.

Wong, Hang, Ka-Leung Lau, and Kwai-Man Luk. "Design of dual-polarized L-probe patch antenna arrays with high isolation." IEEE Transactions on Antennas and Propagation 52.1 (2004): 45-52.

Yan, Jie-Bang, et al. "Multiangle, frequency, and polarization radar measurement of ice sheets." IEEE Journal of Selected Topics in Applied Earth Observations and Remote Sensing 13 (2020): 2070-2080.

Yan, R. D. Hale, A. Mahmood, F. Rodriguez-Morales, C. J. Leuschen and S. Gogineni, "A Polarization Reconfigurable Low-Profile Ultrawideband VHF/UHF Airborne Array for Fine-Resolution Sounding of Polar Ice Sheets," in IEEE Transactions on Antennas and Propagation, vol. 63, No. 10, pp. 4334-4341, Oct. 2015.

Zhang, Tianling, et al. "Ultra-wideband linearly polarised planar bowtie array antenna with feeding network using dielectric-based inverted microstrip gap waveguide." IET Microwaves, Antennas & Propagation 14.6 (2020): 485-490.

Zhang, Ying, et al. "A coplanar waveguide-fed flexible antenna for ultra-wideband applications." International Journal of RF and Microwave Computer-Aided Engineering 30.8 (2020): e22258.

* cited by examiner

200

250

300

350

400

500

550

600

630

660

700

750

800

850

1000

1050

COPLANAR SIDE-FED TIGHTLY COUPLED ARRAY WITH DUAL-POLARIZATION

CROSS-REFERENCE TO RELATED APPLICATIONS

This application claims the benefit of priority to U.S. Provisional Patent Application No. 63/194,405, filed on May 28, 2021, entitled "COPLANAR SIDE-FED TIGHTLY COUPLED ARRAY WITH DUAL-POLARIZATION," the contents of which are hereby incorporated by reference in their entirety.

BACKGROUND

A tightly coupled array (TCA) is a very good candidate for high-power (>100 W) VHF/UHF ground penetrating radars thanks to its ultra-wideband performance and low-profile structure. Nevertheless, the low-profile limits the use of vertical baluns and impedance transformers supporting wideband and high-power. Although there are designs avoiding the use of balun, these still need additional matching networks, which can increase the weight and complexity. Thus, it is important to have a lightweight, simple, and mechanically robust TCA design for VHF/UHF polar ice-sounding.

It is with respect to these and other considerations that the various aspects and embodiments of the present disclosure are presented.

SUMMARY

This disclosure addresses the issue of needing wideband vertical baluns and matching networks for tightly coupled arrays (TCAs).

In an implementation, a radar system is provided. The system includes a radar device and a TCA. The TCA includes a plurality of antenna array elements integrated with the radar device.

Implementations may include some or all of the following features. The TCA may include an ultra-wideband dual-polarized bowtie antenna array. The plurality of antenna array elements may include 12×12 dual-polarized bowtie antenna elements and 288 feeding ports, wherein the 288 feeding ports comprise 144 ports for vertically polarized (V-Pol) bowtie antennas and 144 ports for horizontally polarized (H-Pol) bowtie antennas. The TCA may include a planar feeding structure without balun. Each antenna array element of the TCA may have a microstrip feeding line integrated with a first arm of a bowtie antenna. The system may further include a ferrite core around a coax cable for common mode suppression. The radar device may be a ground-based penetrating radar device. The radar device may be a UWB radar device that operates over the VHF and UHF bands with dual-polarized configuration. The TCA is configured for polar-ice sounding. Each antenna array element of the TCA may be of a single element design. Each antenna array element of the TCA may be a dual-polarized element design. The TCA may be of a finite array design.

In an implementation, an antenna array for ground-based penetrating radar is provided. The antenna array may include an ultra-wideband dual-polarized tightly coupled bowtie antenna array with a plurality of array elements.

Implementations may include some or all of the following features. The antenna array may be a TCA. The array elements may include 12×12 dual-polarized bowtie antenna elements with a total of 288 feeding ports, wherein the 288 feeding ports comprise 144 ports for vertically polarized (V-Pol) bowtie antennas and 144 ports for horizontally polarized (H-Pol) bowtie antennas. The TCA may include a planar feeding structure without balun. Each antenna array element of the TCA hay have a microstrip feeding line integrated with a first arm of a bowtie antenna, and a second arm of the bowtie antenna is directly fed by the microstrip feeding line. The TCA may be configured for polar-ice sounding. Each antenna array element of the TCA may be of a single element design or each antenna array element of the TCA may be a dual-polarized element design. The antenna array may include a ferrite core around a coax cable for common mode suppression.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1A:
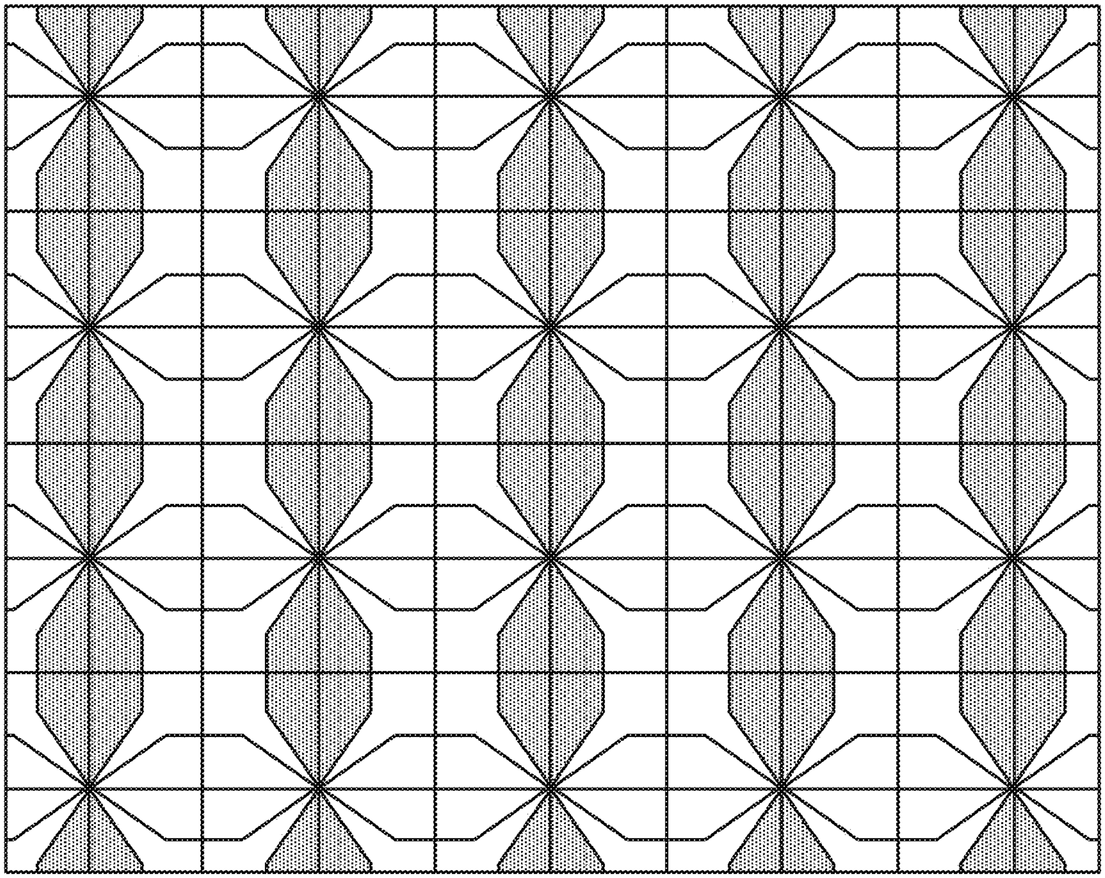
FIG. 1A shows a top view of a small section of an implementation of a coplanar side-fed dual-pol array structure.

The description is not to be taken in a limiting sense, but is made merely for the purpose of illustrating the general principles of the invention, since the scope of the invention is best defined by the appended claims.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Various inventive features are described herein that can each be used independently of one another or in combination with other features.

In an implementation, an ultra-wideband dual-polarized tightly coupled bowtie antenna array for ground-based polar ice sounding radar is described. The antenna array design for ground-based polar ice sounding radar system has always been challenging. For good penetration of 3 km Greenland ice sheets, for example, the antenna array needs to have very large effective aperture to increase the directivity. At the same time, it should be lightweight and low profile to minimize the payload and maximize the survey range. Also, the large antenna array should have modulated design for easy transportation. The radar is used to provide scientists with high resolution echograms of Greenland ice sheets and useful information of ice crystal orientation. For these purposes, the antenna array should have very wide bandwidth and a dual-polarized configuration.

To meet the requirements, an ultra-wideband (UWB) dual-polarized tightly coupled bowtie antenna array for ground-based polar ice sounding radar is provided. In an implementation, the antenna array operates between 180-620 MHz with a fractional bandwidth of 3.4:1. The broadband performance benefits from the tightly coupled antenna elements. The size of the full array may be 2.8×2.8 m but the weight may be only 90 kg, in an implementation. The antenna array has a low-profile of 12.7 cm, which is only about 0.08λ at the lowest operating frequency. The array contains 12×12 dual-polarized bowtie antenna elements with a total of 288 feeding ports: 144 ports for vertically polarized (V-Pol) bowtie antennas and 144 ports for horizontally polarized (H-Pol) bowtie antennas. The V-Pol and H-Pol bowtie antennas are co-located with a mutual coupling of less than −35 dB. 144 feeding ports for each polarization are combined to 12 channels with compact power dividers. Each power divider can handle 800 W input power with 10% duty cycle.

A feature of the antenna array is the planar feeding structure without balun. Different from the normal dipole antennas which requires balanced feeding at the center of two arms, the provided antenna array element is fed at one side with a microstrip feeding line integrated with one arm of the bowtie antenna. The other arm is excited through the coupling from the microstrip line. By adding a ferrite core around the coax cable for common mode suppression, the bowtie antenna element can be fed differentially without using bulky vertical feeding structure and balun.

Conventional tightly coupled arrays (TCAs) consist of center-fed dipoles with input impedance larger than 100Ω, which means additional balun and matching networks are required. In embodiments provided herein, with bowtie antennas, the tapered, 50-100Ω microstrip line impedance transformer is integrated into one bowtie arm. The other bowtie arm is excited through coupling from the microstrip feed line. Thus, the dipole is directly fed by a coaxial cable with a ferrite core at the wider end of one bowtie arm.

The coplanar side-fed structure of the invention avoids additional vertical baluns commonly used in the current TCA, which provides a lighter weight, more cost-efficient, and much simpler planar array solution for ultra-wideband ground penetrating radars. Meanwhile, the array can operate over 3.4:1 fractional bandwidth with no resonance.

More particularly, and as described in further detail herein, a planar ultra-wideband (UWB) dual-polarized tightly coupled bowtie antenna array for ground-based polar ice sounding radar is provided. In an implementation, the array operates over 180-620 MHz with a bandwidth ratio of 3.4:1. The broadband performance is benefit from the tightly coupled antenna elements. By carefully integrating the impedance matching network into one arm of the bowtie antenna and using a ferrite core for common mode suppression, this coplanar side-fed array avoids the use of vertical balun and external antenna matching network. The size of the full array is 2.8 m×2.8 m with a weight of only 90 kg, including 24 power distribution boards and 288 feed cables. The thickness of the array is 12.7 cm, which is only about 0.08λ at the lowest operating frequency. The antenna array may be used as part of a surface-based UWB ice-sounding radar to measure and characterize Greenland ice sheet.

The Greenland annual ice loss rate by 2012 was reported to be 4 times the rate in 2003 and is mainly through the several major fast-flowing glaciers in Greenland. The Northeast Greenland Ice Stream (NEGIS) contributes to approximately 15% of Greenland Ice Sheet (GrIS) drainage. Therefore, a better insight into the ice stream dynamics and its relationship with basal conditions and ice internal fabric can help improve ice sheet models and thereby improve the prediction of sea level rise resulting from ice loss. As apart of the East Greenland Ice-Core Project (EGRIP), Remote Sensing Center (RSC) at the University of Alabama (UA) developed and deployed multiple surface-based ice-sounding radar devices equipped with large-aperture antenna arrays to Greenland in 2019. One of the radar devices, referred to as the UWB radar device, operates over the VHF and UHF bands with dual-polarized configuration. A corresponding antenna array design is described herein.

The UWB radar device is specifically designed to provide scientists with high resolution (0.5 m) ice stratigraphy data down to the bottom of the ice as well as information on ice crystal orientation. Thus, the radar device requires to operate over a wide bandwidth and support dual-polarized configuration. The radar device also needs to have a high sensitivity to sound the bottommost ice layers with very small reflection coefficients. Radar sensitivity is directly related to its power-aperture product. Both high power and large aperture are desired to map layers close to the bed. The present transmit power of the UWB radar is 2 kW. Any further increase of the transmit power will add weight and volume to the system and cause thermal management issues. Thus, a large-aperture, high-gain array design becomes important. Meanwhile, the large array is lightweight, low-profile, and can be easily modularized for transportation to the polar regions for remote sensing missions. Importantly, the array needs to have at least 300 MHz bandwidth and support dual-polarization measurements. Therefore, there is a need to develop a deployable, high-gain and dual-polarized planar phased array with more than 3:1 bandwidth to support the required radar measurements.

Phased arrays have been used for radar s and communications for decades. Microstrip patch array is one of the most popular choices. It has low-profile design and does not require vertical feeding structure. It can also be configured easily to obtain dual polarization with different methods. However, patch arrays are mostly narrowband. Vivaldi antenna arrays are often used for UWB applications. However, they need a long and tapered opening to gradually transition guided waves into radiated waves and match the guided impedance to the 377Ω free-space impedance. Such transition is hard to implement at VHF and UHF frequencies due to weight and size limitations. Another wide bandwidth option is the long-slot array. Such slot antenna has a wideband performance because it supports TEM mode with a very low cut-off frequency. Lee's UHF continuous long-slot array achieves a 4:1 bandwidth ratio with a complementary design. However, it also requires an UWB impedance matching network. Ferrite impedance transformer is commonly used to match 50Ω to 377Ω, but it potentially increases the antenna weight for high-power applications.

Another candidate with UWB performance is the tightly coupled array (TCA). Similar to the current sheet array (CSA), the UWB property of TCA is based on Wheeler's current sheet theory. By carefully adjusting the element spacing, the capacitance introduced by tightly coupled antennas cancels out the inductance caused by a large ground plane. This minimizes the antenna reactance over a wide bandwidth, which results in ultra-wideband impedance matching with a low-profile design. Nevertheless, the low-profile ($<\lambda/8$) limits the use of balun and additional matching networks. Holland's PUMA array solves the issue by adding shorting posts at the dipole arms and putting matching networks on the back of the ground plane. However, the additional level of complexity could increase the payload and reduce the mechanical stability when moving on rough ice surface.

To simplify and optimize the array structure for polar ice sounding, an efficient VHF/UHF planar TCA design is provided herein without the use of vertical balun and extra matching networks.

Figure 1B:
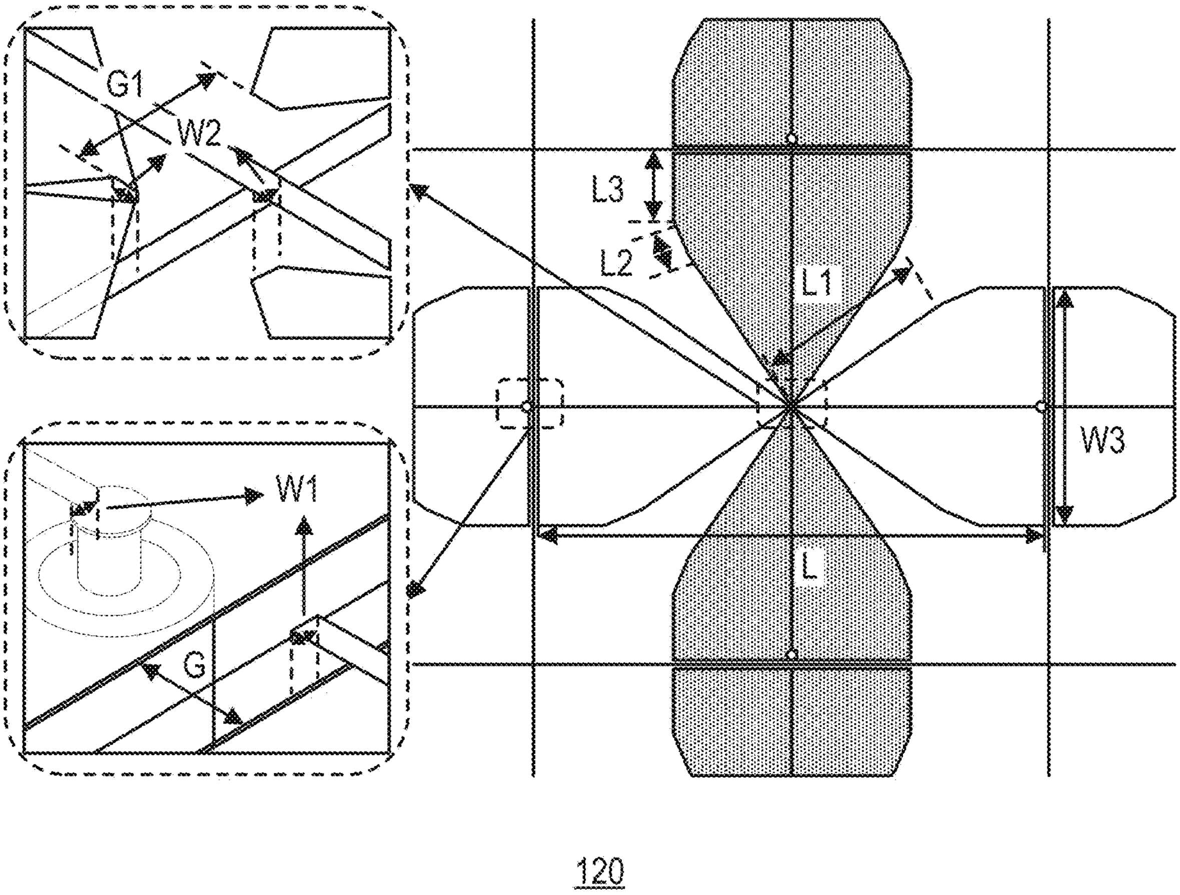
FIG. 1B shows unit-cell dimensions of an implementation of a coplanar side-fed dual-pol array structure.
Figure 1C:
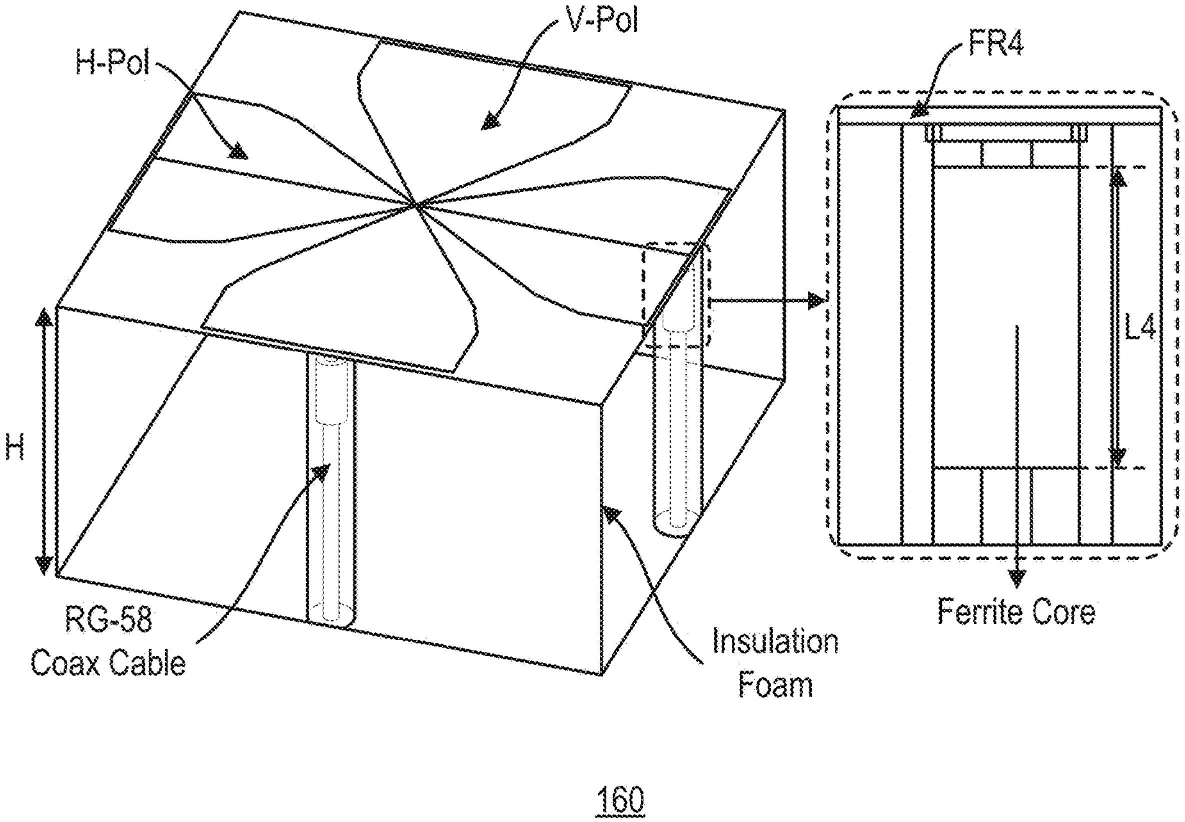
FIG. 1C shows unit-cell design and co-planar side-fed structure of an implementation of a coplanar side-fed dual-pol array structure.

A single element design is described. In the typical bowtie antenna design, two arms are fed symmetrically at the center with equal-magnitude and out-of-phase currents. This usually requires a vertical balun and a matching network for impedance transformation if fed with a 50Ω source. In an implementation of a single element design, the microstrip tapered impedance transformer is integrated into one arm of the bowtie element as shown in FIGS. 1A, 1B, 1C. FIG. 1A is an illustration of an example array 100 of bowtie antennas. FIG. 1B is an illustration of two example bowtie antenna 120 showing certain measurements and structures. FIG. 1C is an illustration of two example bowtie antenna 160 showing certain measurements and structures.

The 50Ω microstrip feed line is printed on the opposite side of the bowtie radiator. The input of this microstrip feed line, which is located at the wider end of the bowtie arm, is connected to a 50Ω RG-58 coaxial cable, while the other end is gradually tapered to 100Ω to match the input impedance of the bowtie element. The other bowtie arm is excited through the coupling from the microstrip feed line. This side-fed dipole structure avoids the use of vertical balun and additional matching network.

For the dual-polarized (Dual-Pol) antenna element design, both vertically polarized (V-Pol) and horizontally polarized (H-Pol) elements are printed on different sides of the same 1.6 mm FR4 substrate. The V-Pol element is printed on the top with the microstrip tapered transformer on the bottom and the H-Pol element is printed on the bottom with microstrip tapered transformer on the top. The V-Pol and H-Pol bowtie elements are co-located such that they have the same phase center. Despite both V-Pol and H-Pol elements being adjacent each other, the mutual coupling is less than −35 dB.

In TCA designs, proper control of the capacitive coupling between antenna elements is the key to achieve broadband performance. The adjacent dipole elements are either closely spaced, over-lapped, or interdigitated depending on the single-element structure. In an implementation, since the bowtie arms have very wide ends, the elements are placed closely with a spacing (G) of only 3 mm. When G is small, the wideband performance, especially at lower frequencies, becomes very sensitive to fabrication errors and motion-induced element-to-element offsets during field operation. To minimize these errors, the width of the substrate is designed to be slightly larger than the length (L) of the bowtie element, such that the substrate of antenna boards can attach to each other accurately without the need of additional alignment. Also, having the dielectric material between tightly coupled elements can increase the capacitance without further reducing the element spacing.

With the tightly coupled effect, the ground plane distance (H) can be set to as close as 127 mm ($0.082\lambda_{low}$). A thick polystyrene rigid insulation foam is placed between antenna elements and ground plane for mechanical support. Two RG-58 coaxial cables are used to feed the V-Pol and H-Pol elements separately. To suppress the common mode current and the associated in-band resonance, a single Fair-Rite ferrite-core is snapped on each coaxial cable. The ferrite-core is placed close to the input of the antenna for optimal common mode suppression. The design of a complete dual-polarized unit-cell structure is shown in FIGS. 1A-1C and the corresponding design dimensions are shown in Table I.

TABLE I

| Unit-cell Dimensions | | | | | |
|---|---|---|---|---|---|
| L | 225.6 mm | L1 | 82.6 mm | L2 | 19 mm |
| L3 | 30.2 mm | L4 | 28.6 mm | G | 3 mm |

TABLE I-continued

| Unit-cell Dimensions | | | | | |
|---|---|---|---|---|---|
| G1 | 2.9 mm | W1 | 0.72 mm | W2 | 0.55 mm |
| W3 | 105 mm | H | 127 mm | | |

Tuning a finite array is always computationally intensive. A unit-cell representing the infinite array with coupling effects is therefore simulated during the initial design phase. After the base design parameters are determined, a semi-finite array is simulated to estimate the finite array performance. For an implementation of the array design, the feeding coaxial cables and ferrite cores also increase the mesh complexity and slow down the optimization. Based on the simulation, these feeding structures have a very little effect on the array performance. Thus, an ideal unit-cell with no coaxial cables and ferrite cores is used for parametric study in ANSYS HFSS 19.2.

Figure 2A:
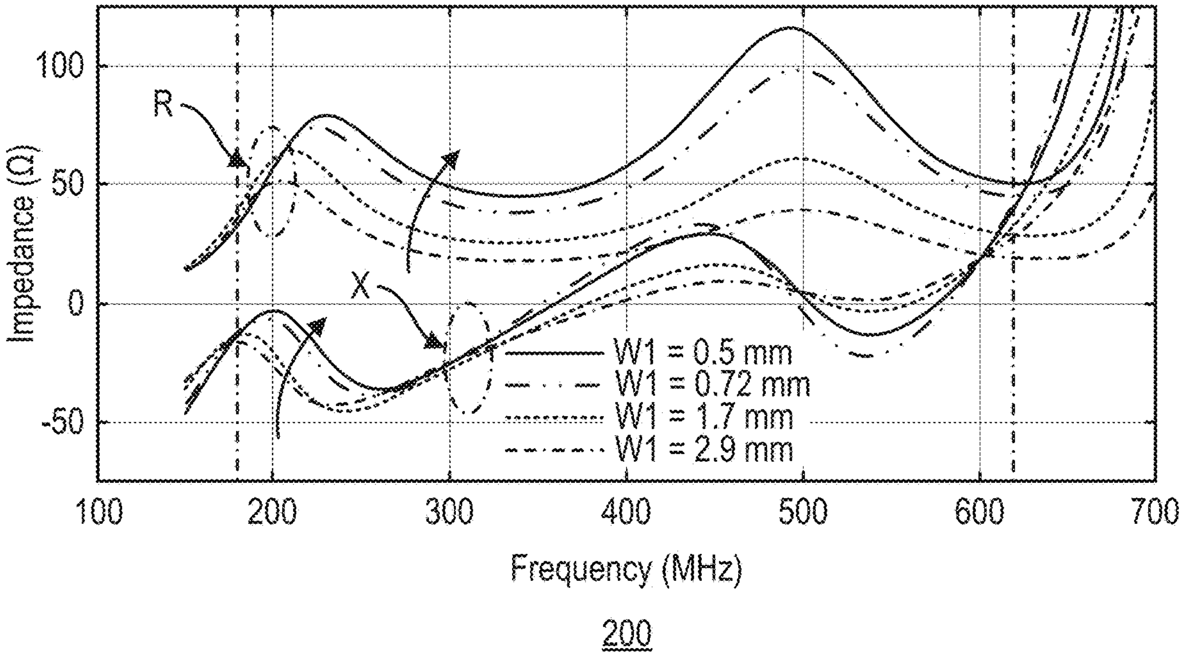
FIG. 2A shows impedance tuning with microstrip feed line width W1 and W2 and the effect of reducing W1 on real and imaginary impedance.
Figure 2B:
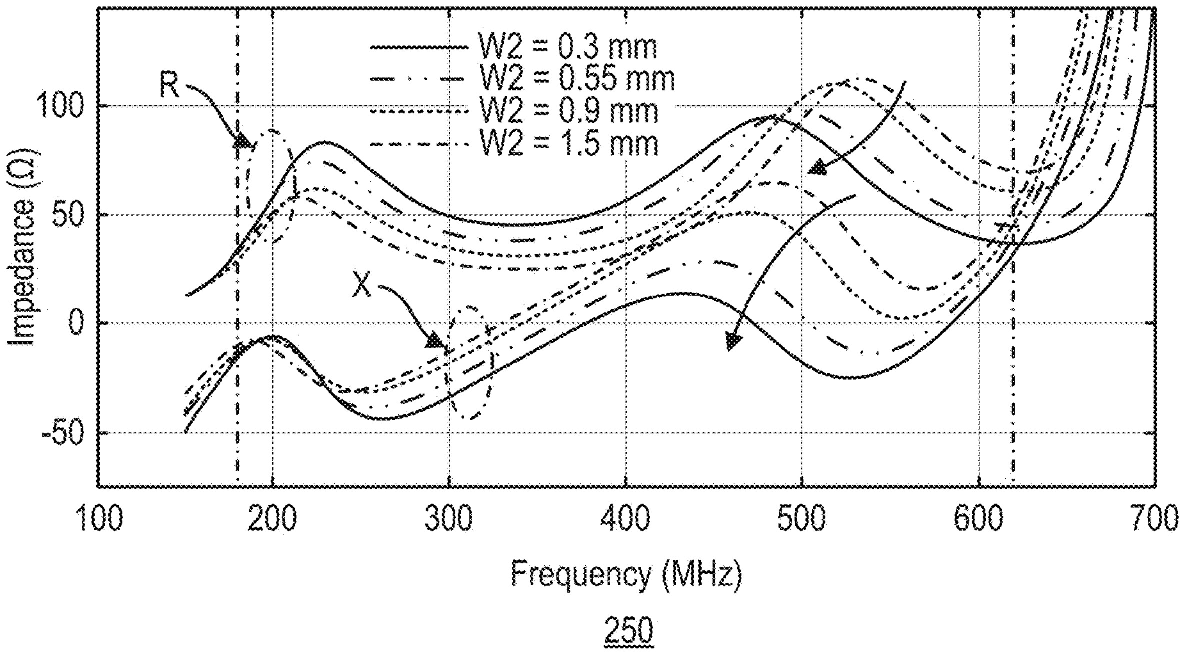
FIG. 2B shows impedance tuning with microstrip feed line width W1 and W2 and the effect of reducing W2 on real and imaginary impedance where R is resistance, and X is reactance.

There are several parameters that have strong effects on impedance matching. The tapered microstrip feed line widths W1 and W2 are discussed first. Since the microstrip feed line is integrated as a part of the bowtie antenna, the width cannot be simply calculated as the standalone microstrip line (MSL). The impedance of this MSL is also affected by the current distribution along the bowtie element and coupling effects between two adjacent antenna elements. In the tuning process, the impedance at the edge of antenna is found to be less than that of a normal MSL with the same width. For instance, the 50Ω MSL on the 1.6 mm FR4 generally has a width of about 3 mm. However, when looking at the graph 200 of FIG. 2A, the 2.9 mm MSL only has a real impedance of less than 25Ω at the center frequency and it is more capacitive at lower frequencies. When reducing W 1, the resistance increases and impedance becomes less capacitive at lower frequencies, which significantly improves the matching from 200 MHz to 400 MHz. W1 is then chosen to be 0.72 mm for the best matching across the bandwidth. At the side of the bowtie arm with a large ground plane structure for MSL, the approximated effective dielectric constant ($\varepsilon_{re}$) is 3.02 using equation (1):

$$\varepsilon_{re} = \frac{\varepsilon_r + 1}{2} + \frac{\varepsilon_r - 1}{2} \frac{1}{\sqrt{1 + 12\ d/W}} \tag{1}$$

where $\varepsilon_r$ is the dielectric constant of the substrate, d is the substrate height, and W is the width of MSL. The feed line width W2 at the center of antenna also affects the input impedance. As contrast to W1, W2 mostly affects the matching between 400 MHz and 600 MHz as shown in the graph 250 of FIG. 2B. This is because the variation of W2 is at the center of antenna element, which mostly determines the high-frequency characteristics and does not contribute to the coupling property. By reducing W2, the impedance of the antenna is closer to 50Ω and becomes less inductive at higher frequencies. By tuning W1 and W2, a broadband impedance matching can be achieved.

Figure 3A:
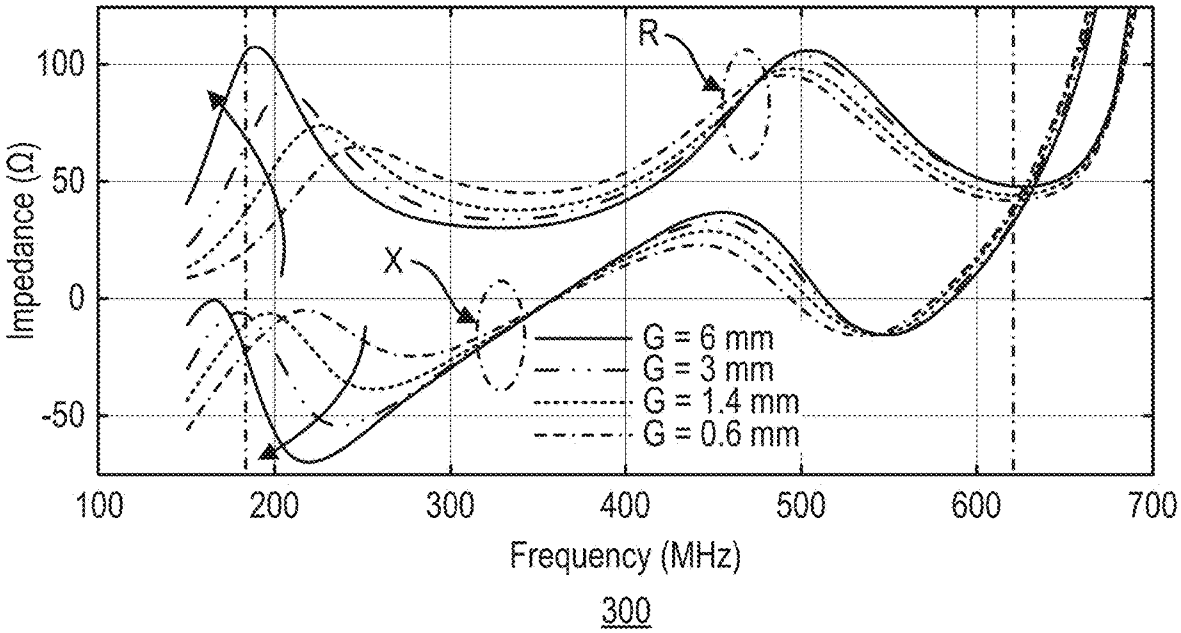
FIG. 3A shows lower band impedance tuning and the effect of increasing adjacent bowtie-arm spacing G on real and imaginary impedance.
Figure 3B:
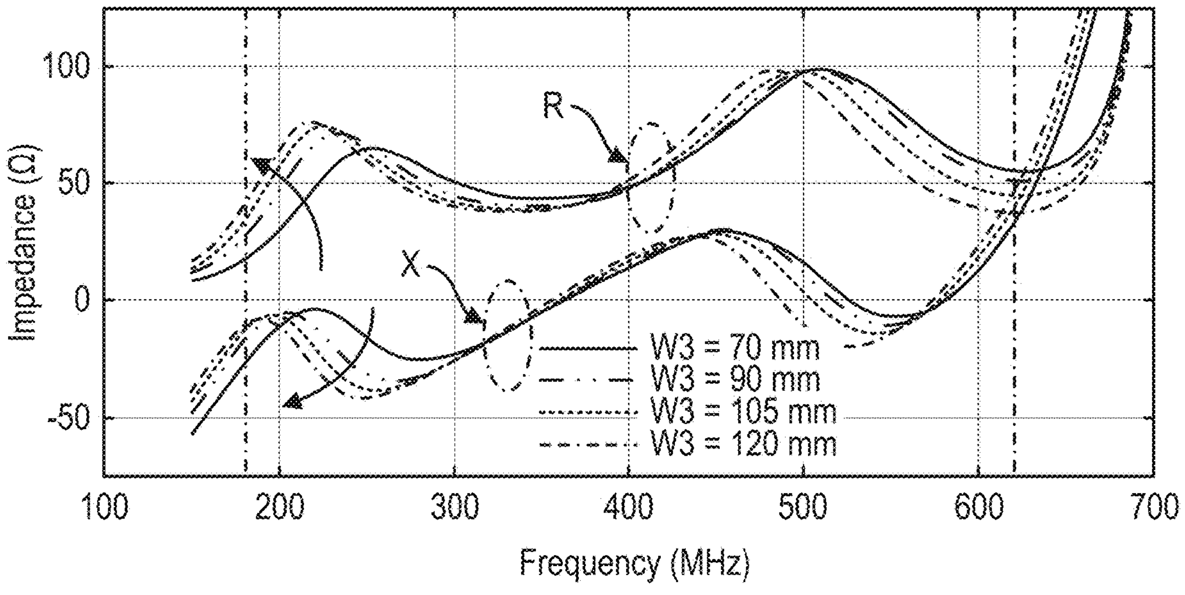
FIG. 3B shows lower band impedance tuning and the effect of increasing bowtie-arm width W3 on real and imaginary impedance where R is resistance, and X is reactance.

Two other design parameters are the bowtie width W3 and element spacing G. These are the key design parameters for any types of TCA because they control the capacitive coupling between antenna elements and extend the lowest operating frequency. The capacitance C between the adjacent antenna elements can be calculated as given by equation (2):

$$C = \varepsilon_{re} \frac{tW3}{G} \tag{2}$$

where t is the thickness of copper. As shown in the graphs 300 and 350 of FIGS. 3A and 3B, when W3 increases and G decreases, a higher capacitance and thus a stronger mutual coupling between adjacent elements can be obtained. This capacitance cancels out the inductive impedance of closely spaced ground plane at low frequencies, resulting in a near 50Ω real antenna input impedance. However, further reducing the spacing will cause a large impedance variation over the bandwidth. Also, the impedance matching is more sensitive to the spacing when it is less than 3 mm Accurate assembly and good mechanical stability are required to ensure the antenna performance.

Figure 4:
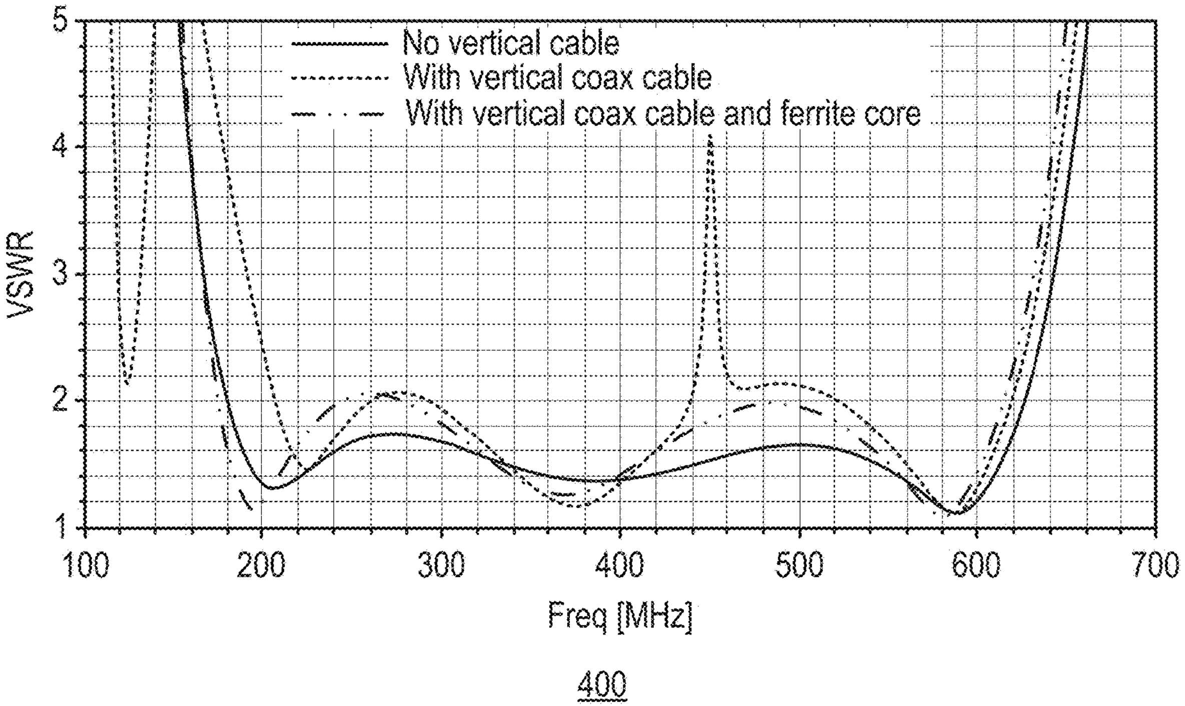
FIG. 4 shows simulated VSWR of a unit-cell showing the performance of broadband matching, the resonance caused by adding vertical coax cables and the resonance suppression result of using the ferrite core.

After the parametric study of an ideal unit-cell, vertical feeding coaxial cables and ferrite cores were added in the simulation, as shown in FIG. 1C. To demonstrate the effect of using ferrite cores for resonance suppression, an ideal unit-cell with no vertical feeding, a unit-cell with only coaxial cables, and a unit-cell with coaxial cables and ferrite cores were simulated. Ther graph 400 of FIG. 4 shows a comparison between the VSWR of three configurations. After tuning, the ideal unit-cell has a VSWR of less than 2 from 180 MHz to 620 MHz, except near 260 MHz where the VSWR is slightly higher than 2. However, when two vertical coaxial cables are added, two common mode resonances at 150 MHz and 450 MHz appear and disrupt the UWB performance After adding ferrite cores around the coaxial cables, two resonances are eliminated, and the impedance is better matched than that of an ideal unit-cell. Meanwhile, the ferrite core only shows a maximum gain reduction of 1.4 dB. The resonance analysis, effectiveness of ferrite cores and the gain performance are described further herein.

Figure 5A:
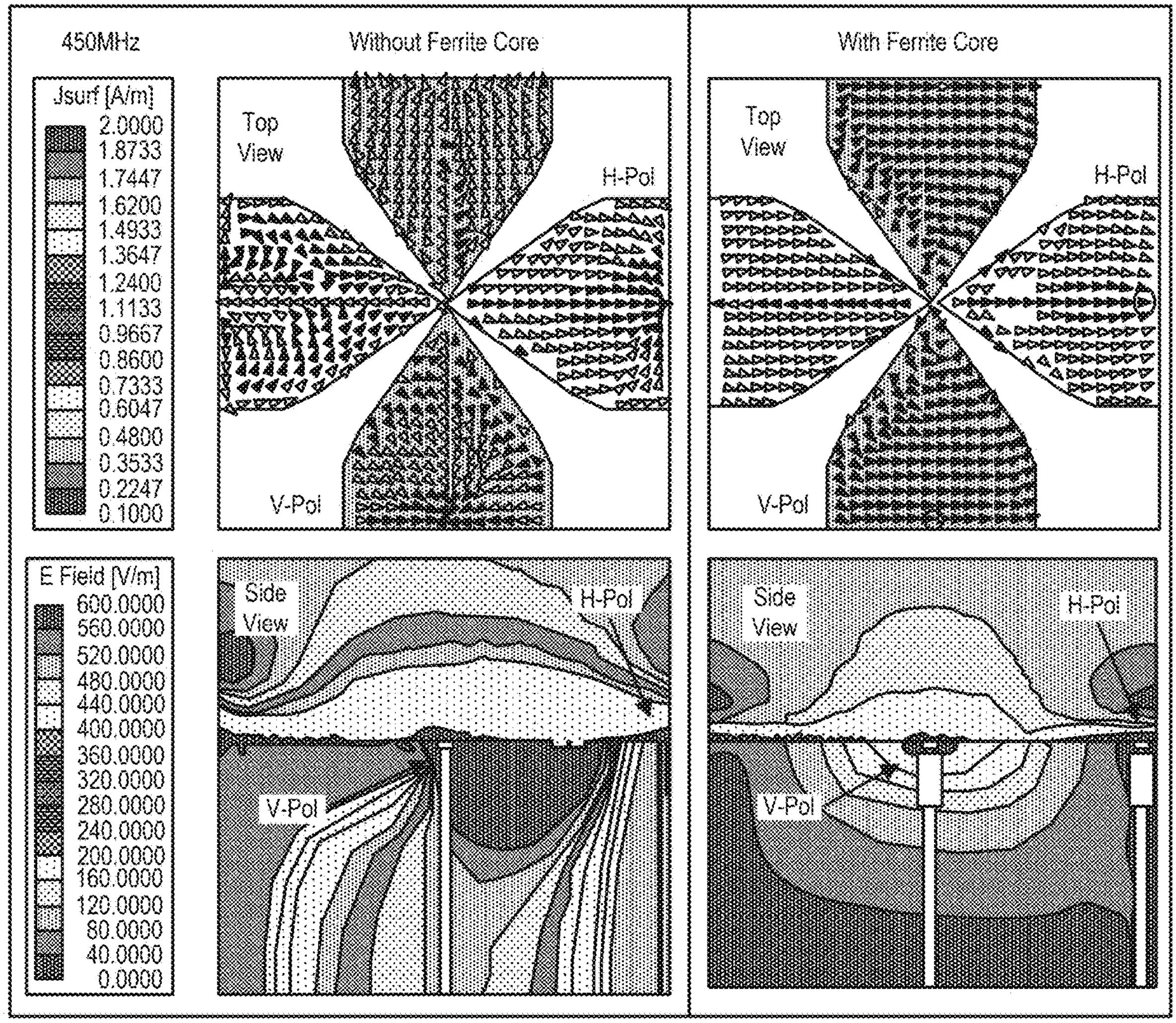
FIG. 5A shows array performance with and without ferrite cores and surface current on dipole arms and the E-field distribution in the E-plane of H-Pol element at 450 MHz.

A resonance analysis is now described. Similar to the center-fed TCA, common-mode current along vertical feeding structures can cause wave propagating orthogonally to the dipole E-plane. This may lead to tilted main-beam and distorted radiation patterns. For phased array application, this will also limit the maximum scanning angle. In the provided side-fed TCA structure, since one arm of the dipole is also used as the tapered ground plane of MSL feeding, common mode current along the vertical coaxial cable is expected. To understand the behavior of these resonances, the unit-cells with and without ferrite cores are simulated in ANSYS HFSS. The surface current on dipole arms and the E-field distribution along dipole E-plane at 450 MHz are shown in the plots 500 of FIG. 5A. In the simulation, only the H-Pol element is excited. Without ferrite cores, the H-Pol dipole element does not have a differential current at both resonances. Also, the V-Pol element, which is not being excited, shows a strong induced current. This leads to an increase in the coupling between V-Pol and H-pol elements, which results in an isolation of only 5 dB at 150 MHz and 10 dB at 450 MHz. As a result, the realized gain is reduced and the E-field deviates from the horizontal direction. By adding the ferrite core around the coaxial cable, both resonances are suppressed, and the dipole current is restored to differential as shown on the right side of the plots 500 of FIG. 5A.

Figure 5B:
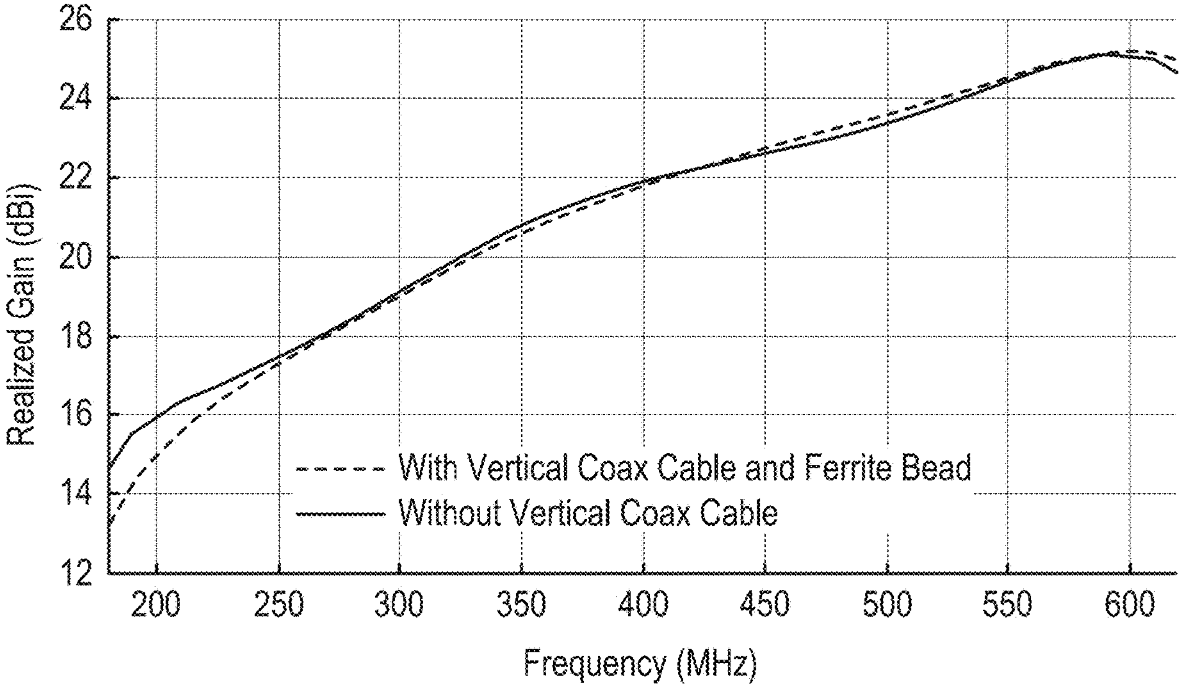
FIG. 5B shows array performance with and without ferrite cores and realized gain of the 12×12 array with ferrite cores compared to the ideal model without vertical coax cable.

Because the common mode current suppression depends on the magnetic loss tangent of the ferrite bead, the antenna efficiency can be affected. However, the degradation is minimal as compared to the benefit of getting a planar structure with less weight and less complexity. To quantify the gain degradation with common-mode suppression, the graph 550 of FIG. 5B shows the simulated realized gain of the 12×12 array with vertical feeding lines and ferrite bead compared to an ideal array without vertical feeding structure. From the graph 550, the 12×12 array has a realized gain of 13-25 dBi, which is very close to the gain of an ideal model. It only shows a noticeable gain degradation from 180 MHz to 230 MHz with a maximum value of 1.4 dB.

Figure 6A:
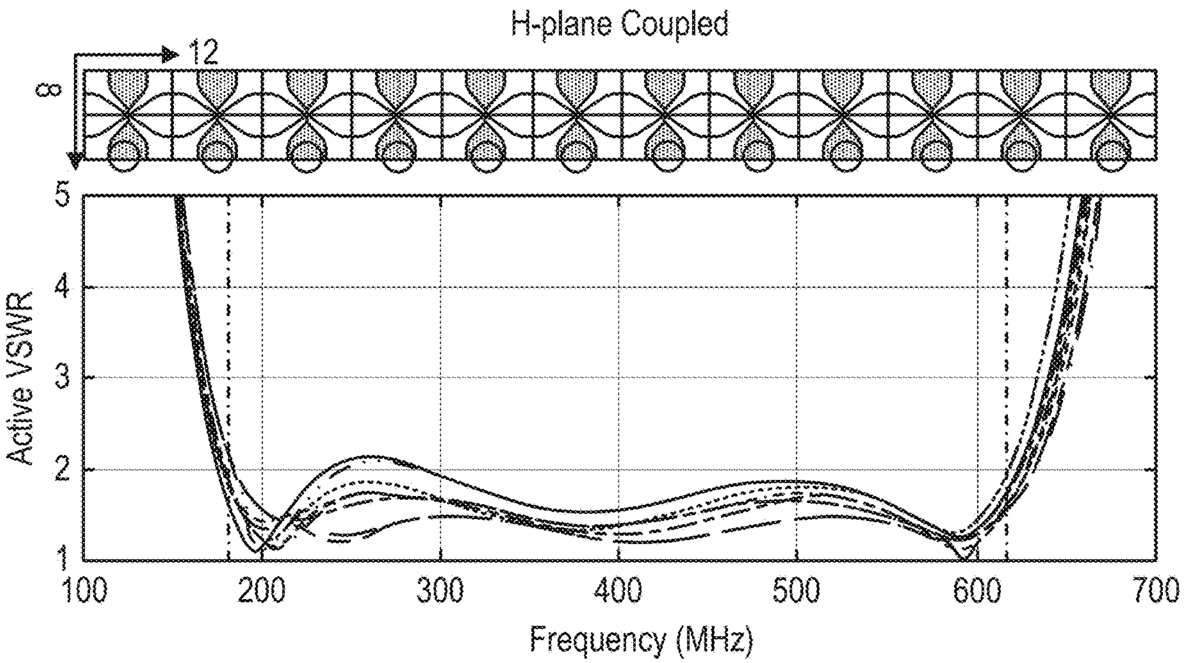
FIG. 6A shows active VSWR of a "12×∞" array and shows H-plane coupled: dipole elements along infinite direction are excited.
Figure 6B:
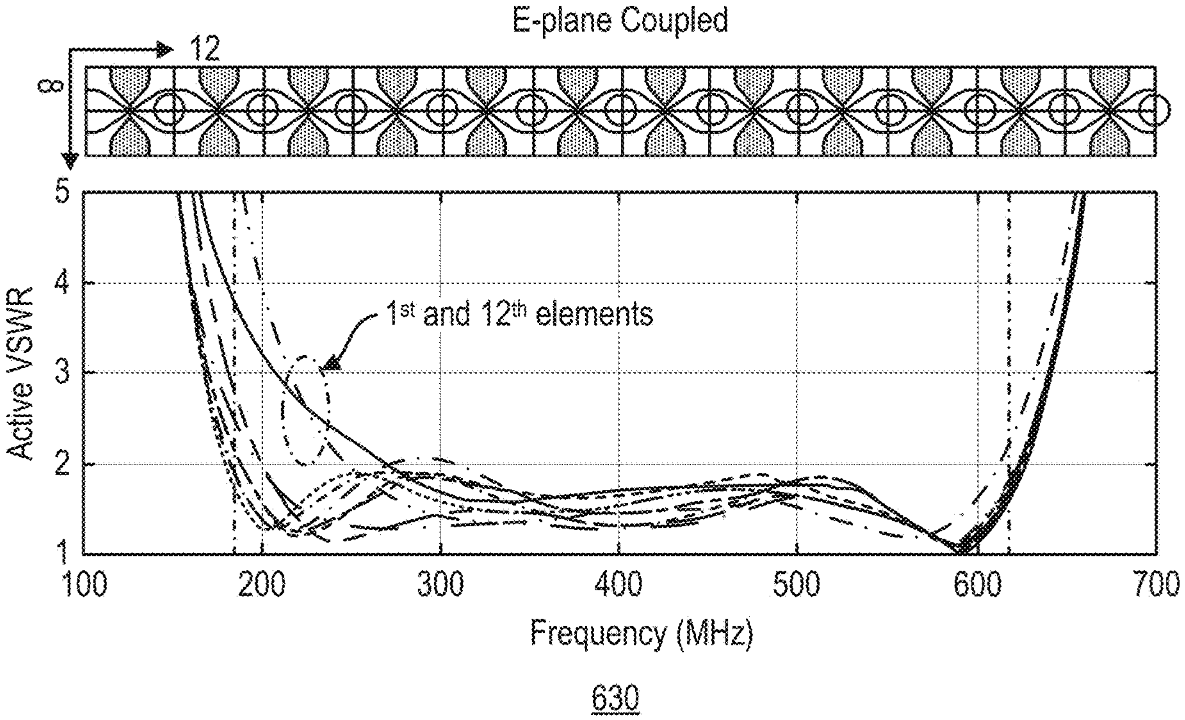
FIG. 6B shows active VSWR of a "12×∞" array and shows E-plane coupled: dipole elements along finite direction are excited.
Figure 6C:
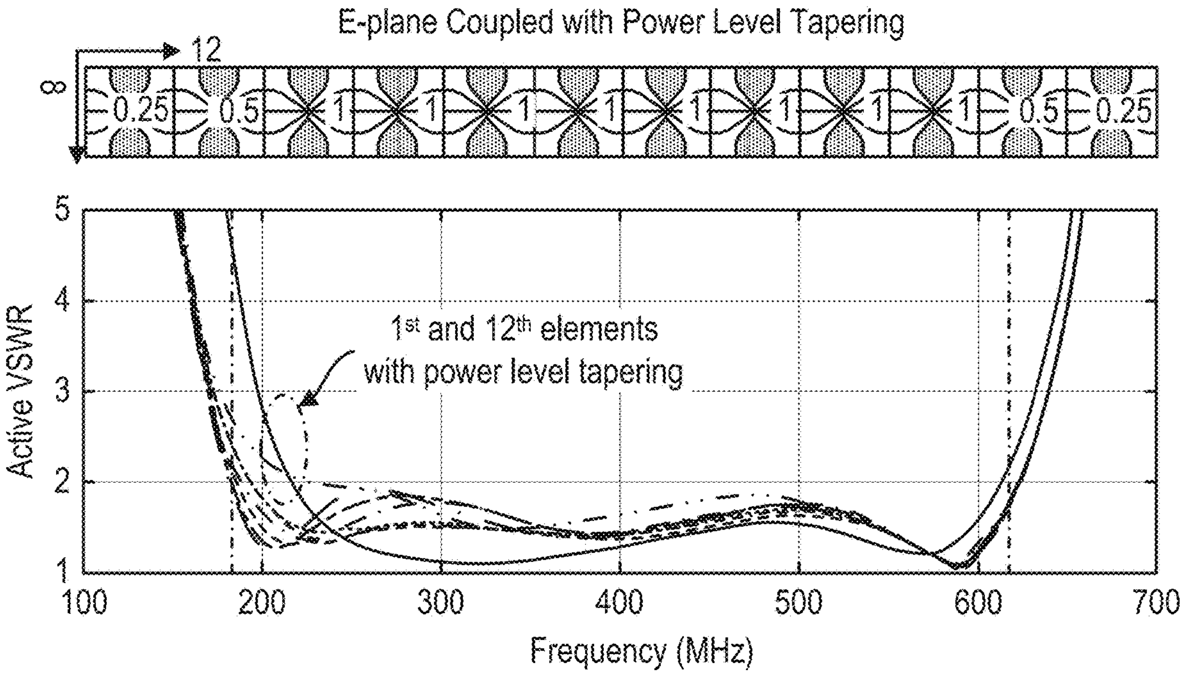
FIG. 6C shows active VSWR of a "12×∞" array and shows E-plane coupled array with power level tapering.

A finite array design is now described. For finite TCAs, the performance relies on the strong coupling between antenna elements. Thus, truncation effect needs to be considered especially when the finite array has a small number of elements. In an example finite array design, 12 elements are used for both V-Pol and H-Pol. To evaluate the truncation effect caused by the edge elements, the array is simulated and evaluated in a 12×∞ configuration. As shown in the graph 600 of FIG. 6A, 12 elements along the infinite direction are excited with equal-phase and equal-amplitude current. The result is very similar to the unit-cell simulation because the truncation effect is mainly from the closely spaced elements in the dipole's E-plane. In this case, these excited elements still behave like infinite array. When 12 elements along the finite direction are excited as shown in the graph 630 of FIG. 6B, the truncation effect comes into place. Two active VSWR curves are found to be much higher than the others at lower frequencies. This is because the edge-elements only have closely coupled elements on one side. There are several ways of reducing the truncation effect such as resistive loading and adding more passive elements on the truncated sides, but these methods can either reduce the efficiency or increase the weight and size. Without adding more structures, apply an amplitude taper for two of the edge elements on each side. The amplitude tapering factor and the improved active VSWR are shown in the graph 660 FIG. 6C.

The finite array contains 12×12 dual-polarized bowtie antenna elements with a total of 288 feeding ports, 144 ports for vertically polarized (V-Pol) elements and 144 ports for horizontally polarized (H-Pol) elements. Because the radar system has a limited number of transmit and receive channels, 144 feeding ports for each polarization are combined into 12 channels using compact power dividers which are discussed further herein.

Figure 7A:
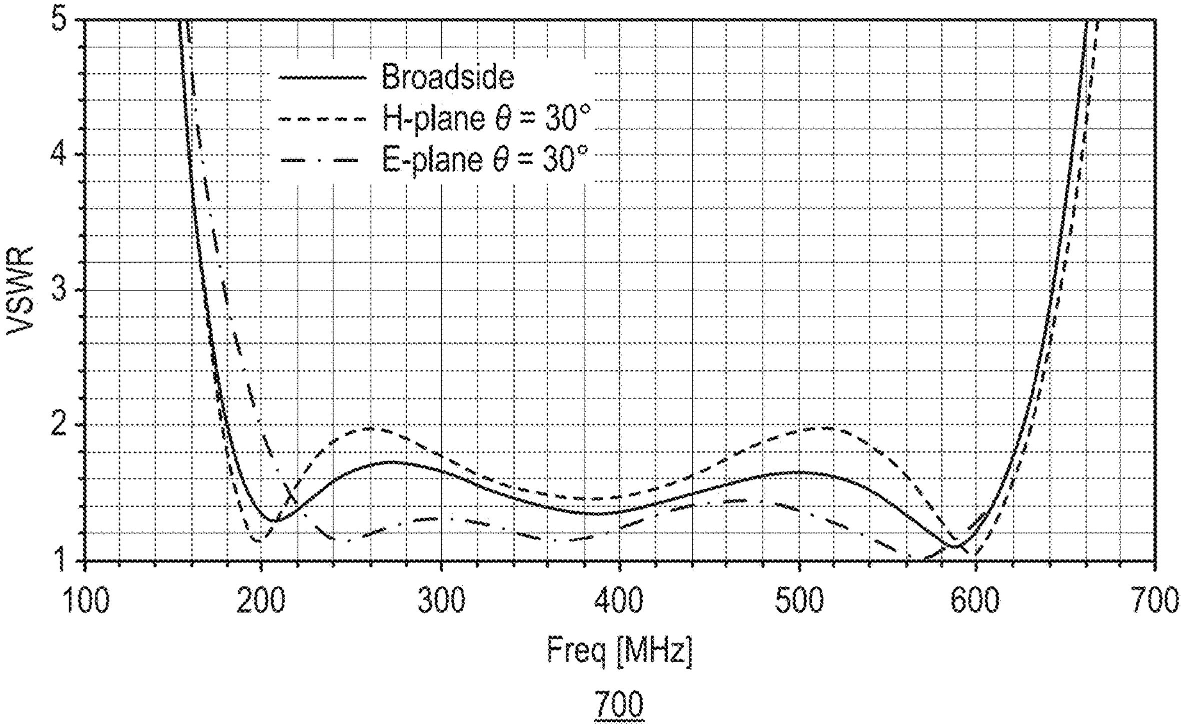
FIG. 7A shows simulated VSWR of a unit-cell infinite array at different scanning angles compared to broadside, with θ=30° in both E-plane and H-plane.
Figure 7B:
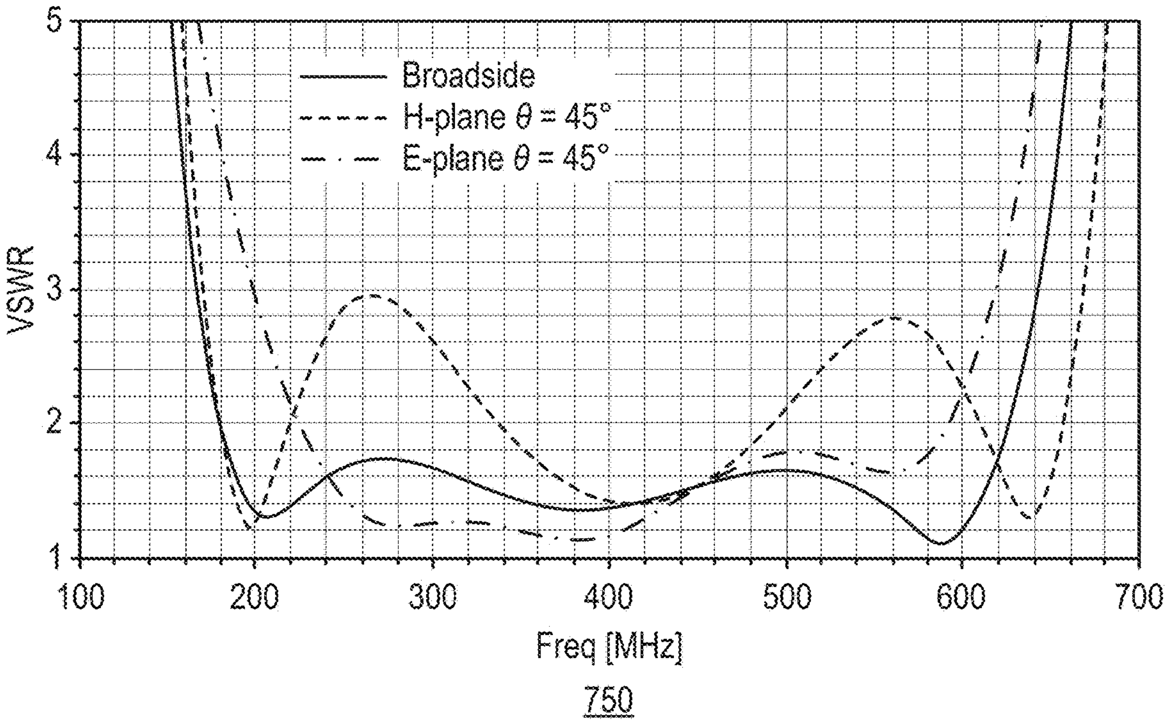
FIG. 7B shows simulated VSWR of a unit-cell infinite array at different scanning angles compared to broadside with θ=45° in both E-plane and H-plane.

A phased array is now described. Phased array can be very useful for ice-sounding radar systems. Steering the beam in cross-track direction can efficiently map a large swath of ice bed topography in a single survey track. As discussed previously, the maximum scanning angle of a phased array can be limited by the vertical feeding structure. To evaluate the scanning performance, a unit-cell model shown in FIG. 1C is simulated. Vertical coaxial cables and ferrite beads are included in the unit-cell simulation. The VSWR plots with the beam steered at 30° and 45° in both E-plane and H-plane are shown in the graphs 700 and 750 of FIGS. 7A and 7B. At 30°, the VSWR shows a similar response as broadside with only a slightly higher level in the H-plane and slightly narrower bandwidth in the E-plane. When scanning to 45°, the infinite-array still maintains a bandwidth ratio of more than 3:1 with VSWR<3.

Figure 8A:
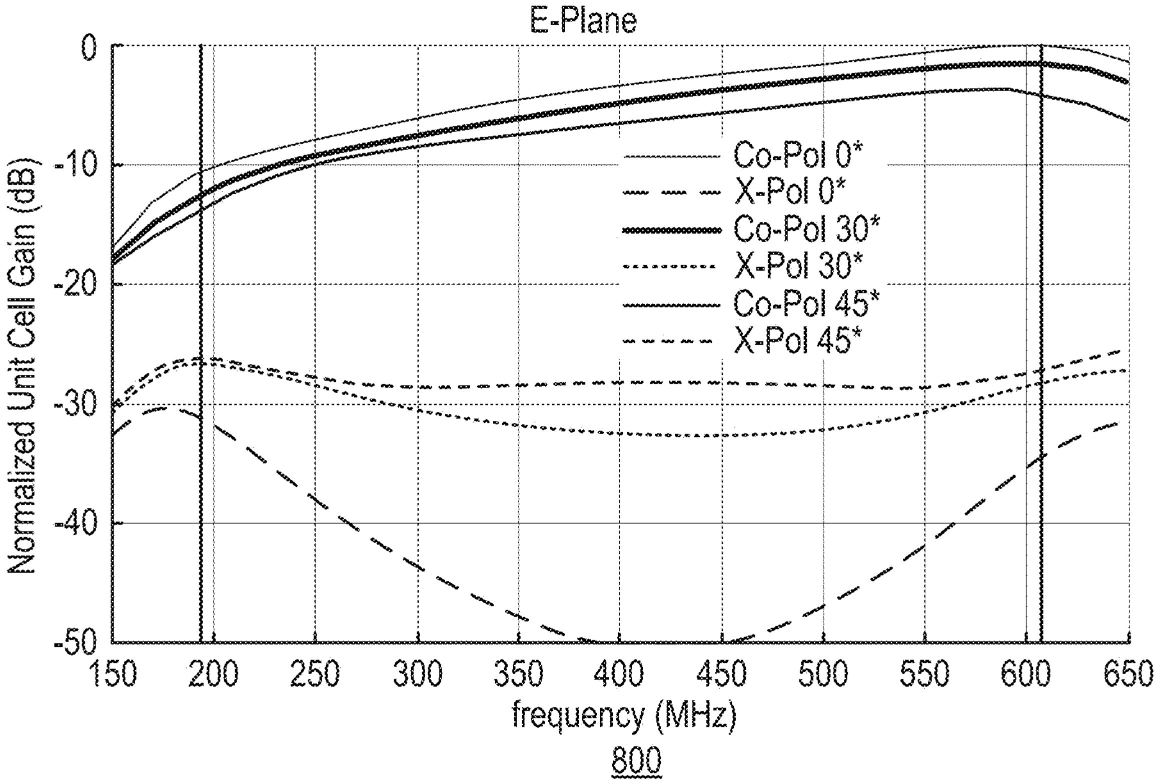
FIG. 8A shows simulated normalized unit-cell gain for Co-Pol and X-Pol vs. frequency at broadside, 30° and 45° with an E-plane scan.
Figure 8B:
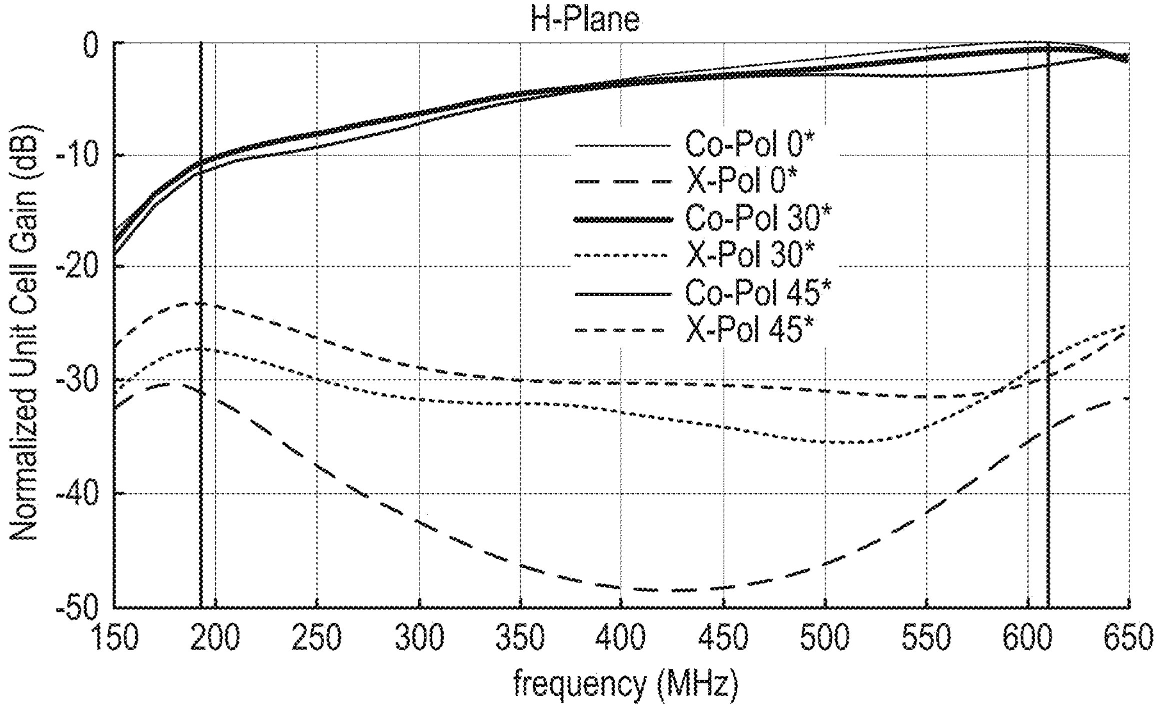
FIG. 8B shows simulated normalized unit-cell gain for Co-Pol and X-Pol vs. frequency at broadside, 30° and 45° with an H-plane scan.

For dual-linear polarized antenna array developed for ice-sounding, good polarization purity is necessary to measure the anisotropy of ice fabric. In the provided antenna array, the co-located phase center and the large bowtie element could introduce high cross-polarization (X-Pol). Thus, the normalized unit-cell gain for co-polarization (Co-Pol) and X-Pol scanning up to 45° in both E-plane and H-plane are analyzed and the results are shown in the graphs 800 and 850 of FIGS. 8A and 8B. In E-plane, the Co-Pol shows a gain variation of 4 dB when scanning from broadside to 45°. The maximum X-Pol level appears at 180 MHz, which is −20 dB at broadside and −13 dB at 45°. In H-plane, the Co-Pol gain has a similar level as in E-plane at most frequencies. It only shows the maximum variation of 2 dB at 570 MHz. The X-Pol level is similar to the performance in the E-plane. In both planes, the Co-Pol gain increases constantly with frequency with no blind angles. The X-Pol level is well below −30 dB at most of the frequencies when scanning at broadside. The measured phased array radiation patterns in finite array configuration are discussed further herein.

Array feeding is described. In an implementation, the radar system is designed to operate from 180 MHz to 480 MHz. Thus, it does not require all the bandwidth provided by the proposed antenna array. To filter out the out-of-band frequencies, the power divider (PD) is only designed to operate up to 480 MHz. The antenna array feeding structure and PD design are described as follows.

Figure 9:
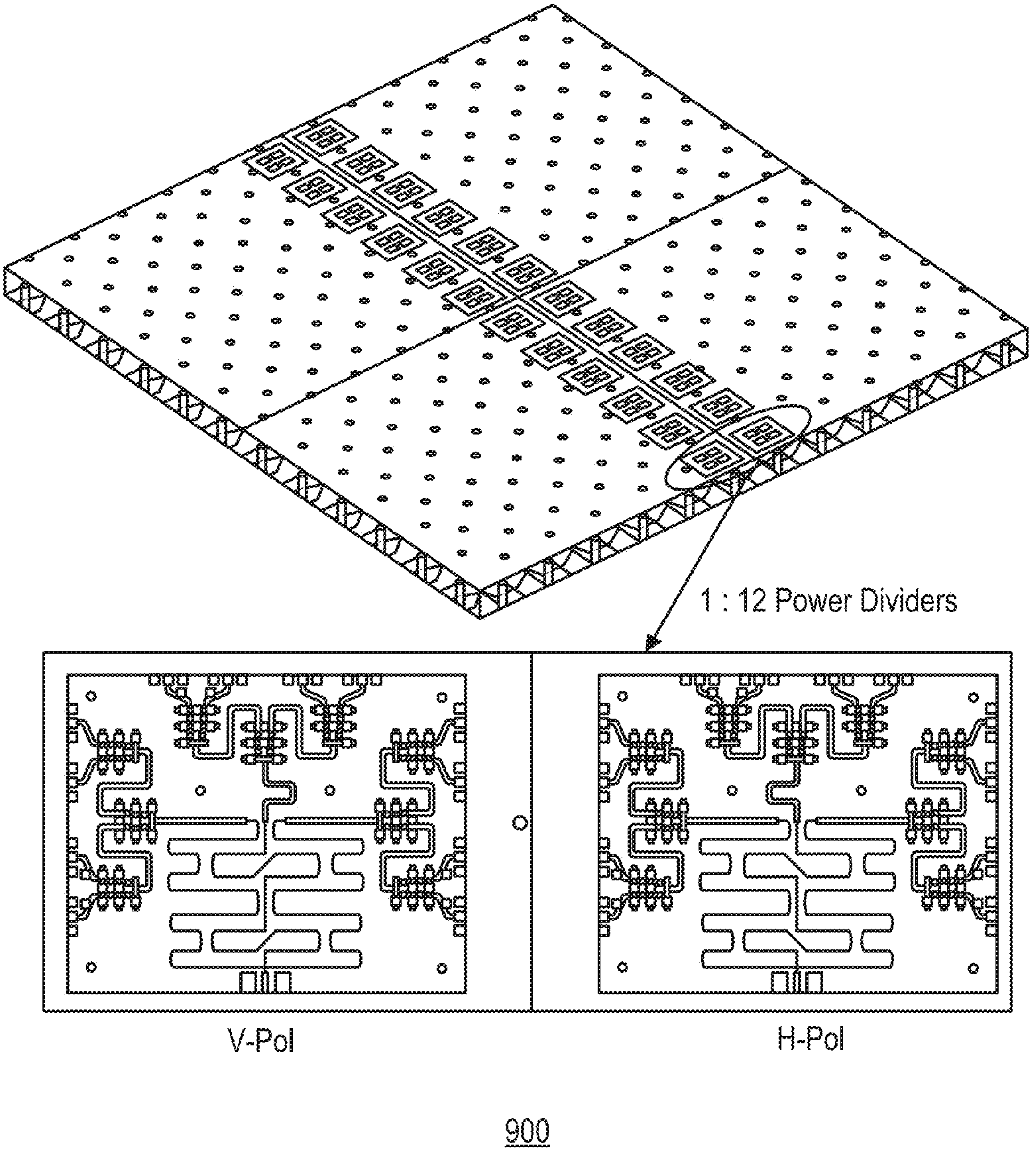
FIG. 9 shows the back side of the antenna array with 24 high-power Wilkinson power dividers.
Figure 10A:
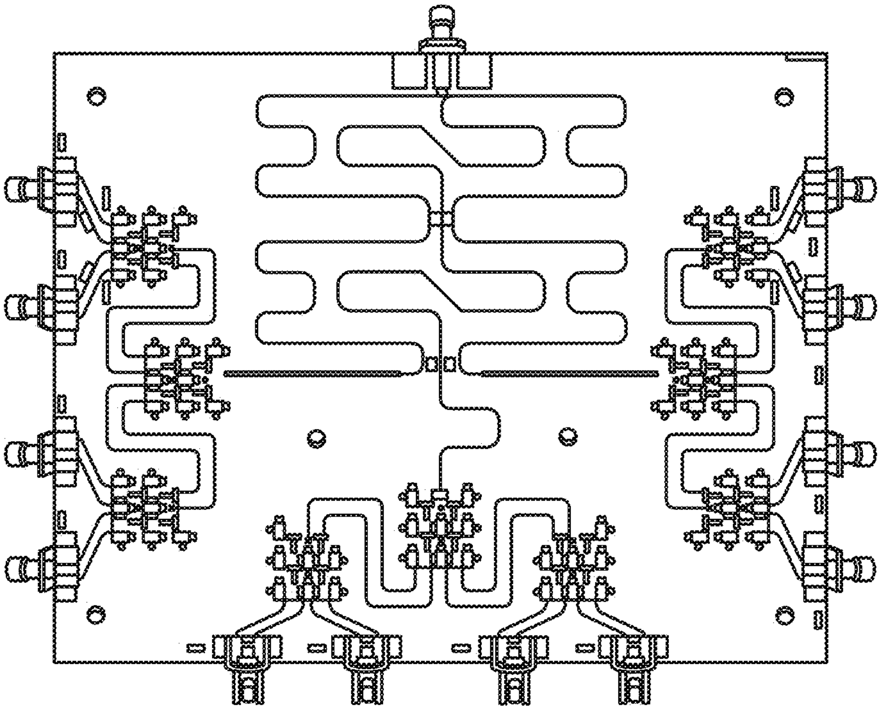
FIG. 10A shows a 1:12 Wilkinson power-divider with lumped components.

The full array is fed by 24 Wilkinson power dividers (PD) which are installed at the back of the ground plane, as shown in the example circuit 900 of FIG. 9. Each of the PD can feed 12 V-Pol/H-Pol elements in a row. There are two reasons for using a Wilkinson PD: high-power handling capability and UWB performance. However, the UWB performance usually relies on the size of PD. The more PD stages used, the wider the bandwidth. Also, each stage requires the MSL to be about ¼ wavelength at center frequency. At VHF frequencies, this leads to a very large PD design which cannot be fit on the array with electrically short antenna elements and tight spacings. Thus, replace the MSL PD at the output with lumped components PD for the minimal size. To increase the isolation and maintain the high-power handling property, chemical vapor deposition (CVD) diamond resistors are placed between adjacent transmission lines. The PD boards are fabricated using low-cost 1.6 mm FR4 substrates as shown in the example circuit 1000 of FIG. 10A. Overall, each PD board only has a size of 17 cm×14 cm and it can handle 800 W peak input power with 10% duty cycle without overheating.

Figure 10B:
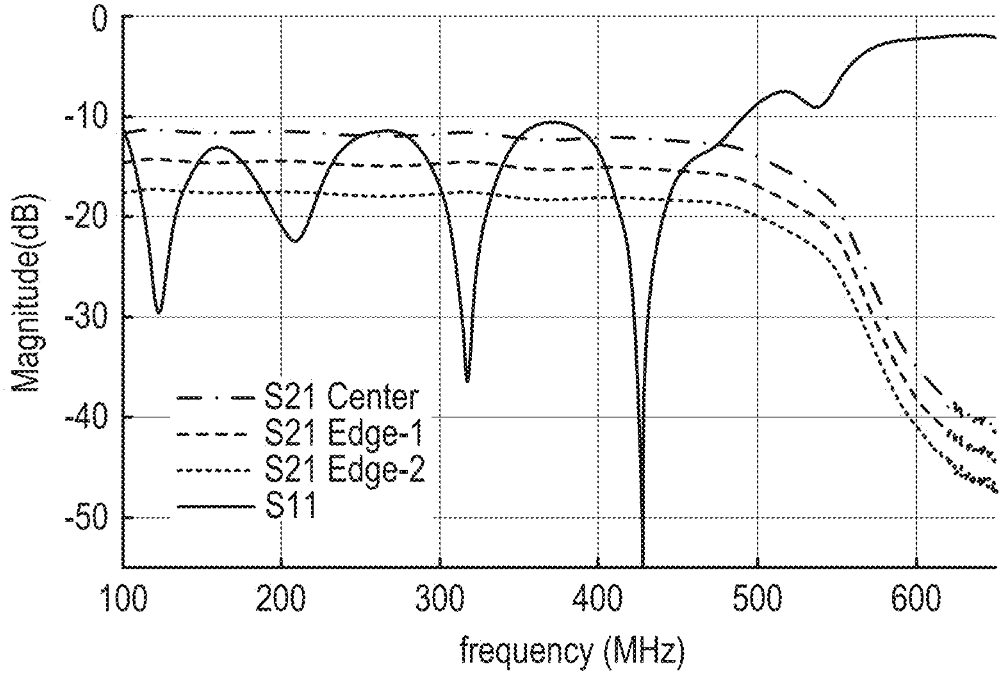
FIG. 10B shows measured |S11| of the input port and |S21| of 8 middle ports with 0 dB attenuation, 2 edge ports with 3 dB attenuation (Edge-1) and 2 edge ports with 6 dB attenuation (Edge-2).

To meet the power-level tapering requirement of the antenna array, two 3 dB and two 6 dB attenuators are placed to the outermost outputs of PD. The reflection coefficient |S11| of the input and the insertion loss |S21| of three outermost outputs are measured and the performance is shown in the graph 1050 of FIG. 10B. The |S21| shows constant magnitude with power level tapering over 180-480 MHz and the |S11| is well below −10 dB.

Simulations have been performed, and based on the simulation results, the array can scan up to 30° with VSWR<2 and 45° with VSWR <3.

The gain of low-profile dipole arrays is usually limited by ground plane spacing and different loading methods for wideband matching. For instance, the UWB ice-sounding array has a ground plane spacing of $0.08\lambda_{low}$ by using resistive loading. However, the simulated gain is 5 dB less than theoretical aperture gain at the higher band. In comparison, the side-fed TCA described herein achieves the same low-profile without resistive loading. Meanwhile, the difference between the theoretical aperture gain and the simulated gain is generally less than 0.5 dB at most frequencies.

The antenna array described herein was deployed to Greenland, with an UWB radar ice sounder operating over 180-340 MHz. During the deployment, the array was installed on a large balloon to minimize the drag and increase the stability when moving over rough ice surface. It has been demonstrated in the field to operate with a peak transmit power of 150 W per subarray channel. With the support of ultra-wide bandwidth, the array improves the radar vertical resolution by 2.7 times as compared to the VHF radar system equipped with a narrower band antenna array. Also, it successfully captured the ice anisotropy effects thanks to the low cross-polarization design.

Thus, implementations of a tightly coupled UWB dual-pol phased array for polar ice-sounding is described herein. The array features a side-fed structure which uses one arm of the bowtie antenna as an impedance transformer. This planar structure eliminates the need of vertical balun and matching network for TCA, which improves the mechanical stability of the array and reduces the payload for ground-based ice-sounding radar systems. A constructed 12×12 array has a measured impedance bandwidth (VSWR<2) of 180-620 MHz (3.4:1), which is optimal for VHF-UHF ground penetrating radar systems. The array was successfully deployed to Greenland for ice-sounding and it will be deployed again with the next generation UWB radar operating from 180 to 480 MHz. This system will support simultaneous quad-polarization ice measurements.

This invention can be used as the front-end of any communication systems which require ultra-wideband and high-gain antenna array with low-cost. This invention is suitable for ground penetrating/airborne radars operating at VHF-UHF frequencies.

The performance of this invention can be limited by the ferrite bead material, especially at higher frequencies (>2 GHz). The limitation can be overcome by using specially designed ferrite beads with a high imaginary part of permittivity.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A radar system comprising:

a radar device;

a tightly coupled array (TCA) comprising a plurality of antenna array elements integrated with the radar device, wherein each antenna array element of the TCA has a microstrip tapered impedance transformer integrated with a first arm of a bowtie antenna, and wherein the microstrip tapered impedance transformer is a 50-100Ω microstrip tapered impedance transformer, wherein the TCA comprises an ultra-wideband dual-polarized bowtie antenna array and a substrate comprising a first side and a second side, wherein the ultra-wideband dual-polarized bowtie antenna array comprises a plurality of vertically polarized bowtie antennas printed on the first side of the substrate and a plurality of horizontally polarized bowtie antennas printed on the second side of the substrate; and a ferrite core around a coax cable for common mode suppression.

2. The system of claim 1, wherein the TCA comprises a planar feeding structure without balun.

3. The system of claim 1, wherein the radar device is a ground-based penetrating radar device.

4. The system of claim 1, wherein the radar device is UWB radar device that operates over the VHF and UHF bands with dual-polarized configuration.

5. The system of claim 1, wherein the TCA is configured for polar-ice sounding.

6. The system of claim 1, wherein each antenna array element of the TCA is of a single element design.

7. The system of claim 1, wherein each antenna array element of the TCA is a dual-polarized element design.

8. The system of claim 1, wherein the TCA is of a finite array design.

9. An antenna array for ground-based penetrating radar, the antenna array comprising an ultra-wideband dual-polarized tightly coupled bowtie antenna array with a plurality of array elements, wherein the antenna array is a tightly coupled array (TCA), wherein each antenna array element of the TCA has a microstrip tapered impedance transformer integrated with a first arm of a bowtie antenna, wherein the microstrip tapered impedance transformer is a 50-100Ω microstrip tapered impedance transformer, wherein the TCA comprises an ultra-wideband dual-polarized bowtie antenna array and a substrate comprising a first side and a second side, wherein the ultra-wideband dual-polarized bowtie antenna array comprises a plurality of vertically polarized bowtie antennas printed on the first side of the substrate and a plurality of horizontally polarized bowtie antennas printed on the second side of the substrate, and further comprising a ferrite core around a coax cable for common mode suppression.

10. The antenna array of claim 9, wherein the TCA comprises a planar feeding structure without balun.

11. The antenna array of claim 9, wherein a second arm of the bowtie antenna is directly fed by the microstrip tapered impedance transformer and is excited through coupling from the microstrip tapered impedance transformer.

12. The antenna array of claim 9, wherein the TCA is configured for polar-ice sounding.

13. The antenna array of claim 9, wherein each antenna array element of the TCA is of a single element design or wherein each antenna array element of the TCA is a dual-polarized element design.

* * * * *